(No Model.)
O. KLATTE.
CONNECTING LINK.
No. 595,542. Patented Dec. 14, 1897.
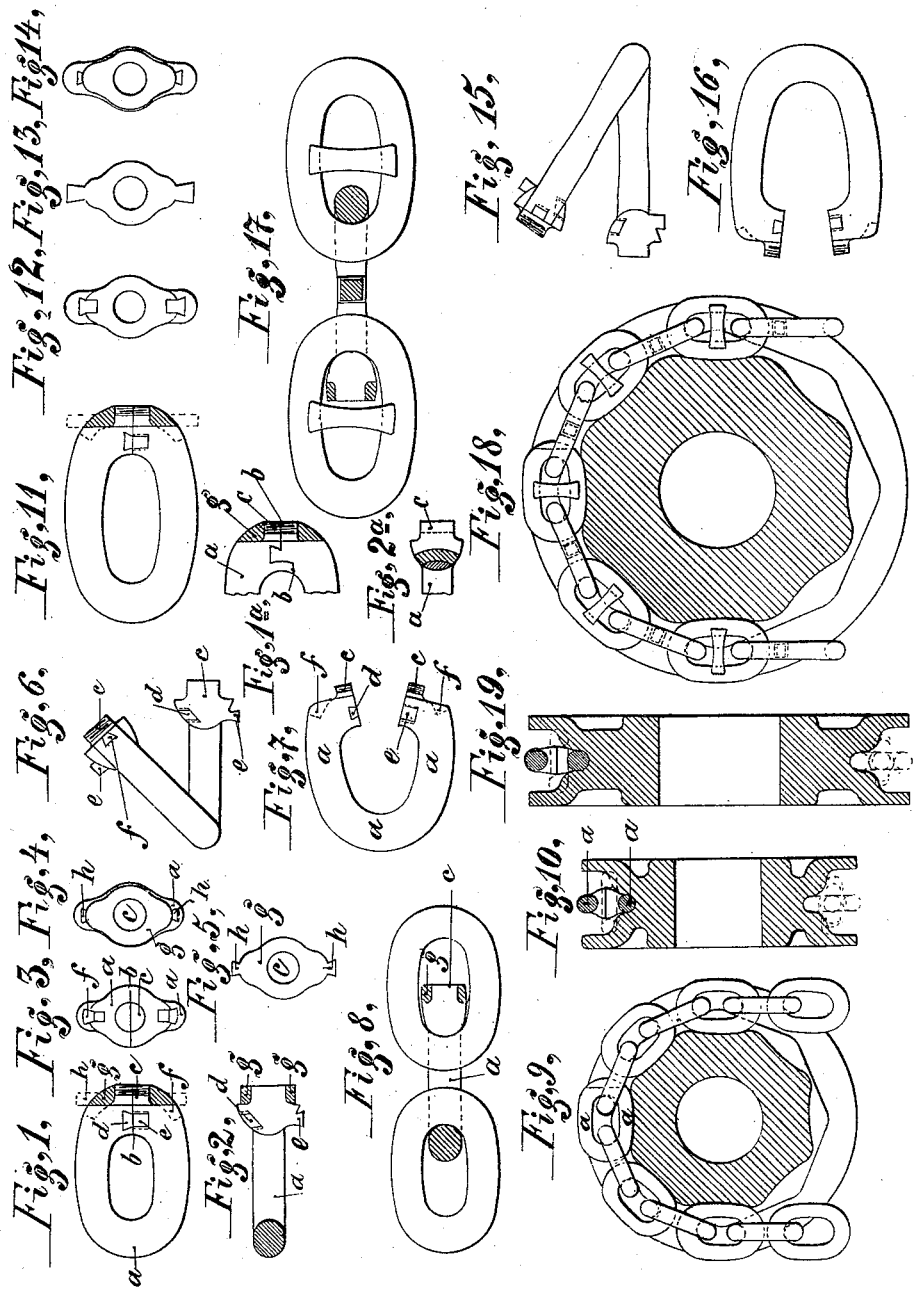
Witnesses:
C. Holloway
W. C. Pinckney
Inventor:
Otto Klatte,
By J. E. M. Bowen
Attorney

UNITED STATES PATENT OFFICE.

OTTO KLATTE, OF NEUWIED, GERMANY.

CONNECTING-LINK.

SPECIFICATION forming part of Letters Patent No. 595,542, dated December 14, 1897.

Application filed December 14, 1896. Serial No. 615,552. (No model.)

*To all whom it may concern:*

Be it known that I, OTTO KLATTE, a subject of the King of Prussia, Emperor of Germany, residing at Neuwied-on-the-Rhine, Germany, have invented certain new and useful Improvements in Connecting-Links or so-called "Connecting-Ties" for Joining two Lengths of Chain, of which the following is a specification.

This invention relates to a connecting-link or so-called "connecting-tie" for joining two lengths of chain; and it consists in a link which when closed is of the same shape as the usual chain-link and which is held together by means of a screw and nut or female threaded portion as well as by means of projections engaging corresponding grooves.

In the accompanying drawings, Figure 1 represents a side view of a connecting-link embodying my invention, the nut employed being shown in section. Fig. 2 is a vertical section taken on the longitudinal axis of the same. Fig. 3 is an end view, looking from the right to the left, of the link shown in Fig. 1, but without the nut; and Fig. 4 is a similar view showing the nut. Figs. 5 to 7 show details hereinafter referred to. Fig. 8 shows two chain-links united by my improved connecting-link, the latter being shown in longitudinal section. Figs. 9 and 10 show a chain-wheel in two sections perpendicular to each other and a chain running upon it, the said chain having an improved connecting-link. Figs. 11 to 16 show in similar views as Figs. 1 and 3 to 7 a link constructed in the same manner, but being longer, so that a transverse stay can be inserted. Figs. 17 to 19 show in similar views as Figs. 8, 9, and 10 the application of the link illustrated in Figs. 11 to 16 to cables or chains having a transverse stay. Figs. 20 to 25 show a modification of the connecting-link.

Referring now to Figs. 1 to 10, $a$ is a connecting-link which consists of one piece, being pressed or rolled and then stamped. One end of the link is (see Fig. 1) thicker and broader than the other. The said broader end is sawed or cut through at $b$ in the direction of its length and the cut surfaces are pressed together. The oval opening of the closed link is uniformly oval.

$c$ is a pin which is turned upon the broad end of the closed link and which is screw-threaded.

$d$ are dovetail-shaped grooves, one of which is formed in the upper portion of one of the cut surfaces and the other in the lower portion of the other cut surface. (See, also, Figs. 6 and 7.) Opposite these grooves the link is provided with corresponding dovetail-shaped tongues $e$.

$f$ are dovetail-shaped grooves formed on the outer surface of the link on both sides of the screw-threaded pin $c$.

$g$, Fig. 5, is a winged screw, of steel or nickel-steel, having upon its wings dovetail-shaped tongues $h$, corresponding in shape to the grooves $f$, made on the outside of the link.

The ends of the lengths of chain to be connected are introduced into the connecting-link in the following manner: The divided link $a$ is opened either as shown in Fig. 6 or as in Fig. 7, the latter being the better way. Before opening the link, however, its undivided end is heated. The end links of the lengths of chain which are to be joined are then introduced into the open connecting-link and the open ends carefully pressed together until the cut surfaces come into contact. After cooling the winged screw $g$ (see Fig. 5) is firmly screwed upon the screw-threaded pin $c$ (see Fig. 1) in such a manner that the ears $h$ on the nut are opposite the grooves $f$. The connecting-link is thereupon heated and the ears $h$ bent round and beaten into the grooves $f$. (See Fig. 4.) At the same time or after a further heating the ears or tongues $e$ (see Figs. 1 and 2) are driven into the grooves $d$. Finally the connecting-link may be trimmed or finished off.

The inner opening of that last link of the one length of chain which is to receive the thicker end of the connecting-link is, when necessary, widened to such an extent that the cross-section of this link does not fall below the cross-section of the bearing parts of the chain-links. In this manner only the reinforced contact parts of this link will serve or provide the material for the widening, as shown in Fig. 8.

The ears $e$ and the grooves $d$ (see Figs. 1 and 2) can be dispensed with when the cut at $b$ is made in a broken line, (see Fig. 1ª,) so that the cut surfaces engage each other in a kind of dovetail joint. The dovetails are curved in such a manner (see Fig. 2ª) that the link can be opened, as shown in Fig. 6. In this case it is not necessary to provide the nut g with the ears h and the link with the grooves f.

This form of connecting-link does not in any way interfere with the running of the chain upon the chain wheel or pulley. (See Figs. 9 and 10.)

Figs. 11 to 19 show a similar but longer connecting-link and its application to cables or chains having a transverse stay. As shown in Figs. 17 and 18, the connecting-link is itself provided with a stay.

Having fully described my invention, what I claim as new, and desire to secure by Letters Patent, is—

1. A connecting-link for chains provided with projections and with corresponding grooves to receive said projections, combined with means for holding the link together, the same comprising a screw and a nut or internally-screw-threaded portion, the link when closed having substantially the form of an ordinary chain-link.

2. A connecting-link for chains, one reinforced or strengthened end of which being split and having formed thereon a bipartite screw-threaded projection, combined with a winged nut screwed upon said projection the cut surfaces of the link being secured together by dovetailing or tongue-and-groove connections.

In testimony whereof I have signed my name to this specification in the presence of two subscribing witnesses.

OTTO KLATTE.

Witnesses:
SOPHIE MAGEL,
W. H. MADDEN.